United States Patent [19]

Riegler et al.

[11] 4,105,343
[45] Aug. 8, 1978

[54] RELEASABLE HUB-SHAFT-CONNECTION MECHANISM

[75] Inventors: Ernst Riegler, Enns; Manfred Schmidt, Linz, both of Austria

[73] Assignee: Vereinigte Österreichische Eisen- und Stahlwerke-Alpine Montan Aktiengesellschaft, Linz, Austria

[21] Appl. No.: 762,046

[22] Filed: Jan. 24, 1977

[30] Foreign Application Priority Data

Feb. 7, 1976 [AT] Austria .................................. 730/76

[51] Int. Cl.² .............................................. F16D 1/06
[52] U.S. Cl. ........................................ 403/15; 403/34; 403/356; 403/27
[58] Field of Search ................. 403/5, 15, 34, 356, 403/357, 370, 371, 369, 31, 37, 40, 350, 27, 16

[56] References Cited

U.S. PATENT DOCUMENTS

| | | | |
|---|---|---|---|
| 2,293,085 | 8/1942 | Stieber | 403/15 |
| 2,855,228 | 10/1958 | Kreissig et al. | 403/358 |
| 3,861,815 | 1/1975 | Landaeus | 403/370 |

FOREIGN PATENT DOCUMENTS

| | | | |
|---|---|---|---|
| 2,445,252 | 7/1975 | Fed. Rep. of Germany. | |
| 168,967 | 10/1959 | Sweden | 403/358 |

Primary Examiner—Andrew V. Kundrat
Attorney, Agent, or Firm—Brumbaugh, Graves, Donohue & Raymond

[57] ABSTRACT

A releasable hub-shaft connection mechanism, in particular to be used in heavy machinery for transmitting strong torques, has a shaft, a hub surrounding the shaft and at least one bore with its axis parallel to the shaft and located at the junction of the shaft and the hub so as to penetrate each equally. A bushing with a cylindrical outer face and a conical inner face is accommodated in the at least one bore, and a tapering bolt is axially displaceable in the bushing, by means of this bolt the bushing is expandible. At a closed bottom end of the bushing, where the bushing has the smallest inner diameter, a further bore extending through the bushing to the outside is located and is connectable to a pressure medium conduit. The tapering bolt is displaceable from a clamped into a release position when the further bore is supplied with a pressure medium from said pressure medium conduit.

11 Claims, 5 Drawing Figures

RELEASABLE HUB-SHAFT-CONNECTION MECHANISM

BACKGROUND OF THE INVENTION

The invention relates to a releasable hubshaft-connection, in particular to be used in the construction of heavy machinery for transmitting strong torques. A typical connection of this type has at least one bore with its axis extending parallel to the axis of the shaft and penetrating the shaft with one half of its circumference and the hub with the other half. The bore is provided for accommodating a bushing having a cylindrical outer face and a conical inner face, wherein the bushing is expandible by means of a tapering bolt that is axially displaceable within the bushing.

Hitherto, in transmitting strong torques between the hub and shaft, press fit or tangential key connections have been used in the construction of heavy machinery, such as the construction of rolling mills and converters.

Press fits have the advantage that the hub and shaft can be quickly released and connected, and after a release no subsequent treatment is necessary for making a renewed connection. However, press fits have the disadvantage that their production is expensive and complex, since narrow tolerances have to be observed. Accordingly, often pieces are obtained which have to be rejected, thus increasing the costs of production.

When conventional tangential keys are used, disadvantages occur, which mainly consist in that, on the one hand, the assembly of the hub and shaft requires a fitting operation for the keys which takes a lot of time and, on the other hand, it is hardly possible to disassemble them. For a disassembly the keys have to be drilled out. If the hub is to be mounted again, new keys have to be fitted. A further disadvantage of the tangential key connection consists in that the sharp-edged notches in the shaft and the hub cause tension peaks, which require a wider diameter of the shaft and a thicker and stronger hub wall.

Furthermore, various hub-shaft connections have been known which are provided with bores along the periphery of the shaft that extend parallel to the axis of the shaft and which penetrate the shaft with one half their circumference and the hub with the other half. In these bores, clamping bolts are insertable consisting of a slit expanding bushing having a conical inner face and a central tapering pin which can be tightened relative to the bushing by a screw thread (German Offenlegungsschrift No. 24 45 252). Because of the slit expanding bushing, the clamping effect of the clamping bolt cannot be precisely determined. A large play is present between hub and shaft, and thus a precise centering of the hub on the shaft, as is necessary for toothed wheels, e.g., is very difficult. For releasing the hub-shaft connection, the tapering pin must be pushed out of the expanding bushing in the axial direction of the shaft by hammer blows. After an extended period of use, fitting rust can require forces for detaching the tapering bolts that are so strong that the tapering bolts or the bushings are damaged when being pushed out.

SUMMARY OF THE INVENTION

The present invention aims at avoiding these disadvantages and difficulties and has as its objects (a) to provide a releasable hub-shaft connection which can be produced in a simple manner without having to observe narrow tolerances of the connection elements, (b) to permit the mounting of the hub on the shaft to be carried out quickly, in a simple manner and to be precisely centrally aligned, and (c) to allow the hub-shaft connection to be released and re-connected frequently without damage or subsequent treatment. Furthermore, tension peaks in the hub and shaft caused by sharp-edged notches are to be prevented so that slight thicknesses of the hub wall and narrow diameters of the shaft suffice.

According to the invention, in a hub-shaft connection of the above-defined kind these objects are achieved in that the bushing has a bottom at the end with the smallest inner diameter and has a bore extending from the bottom through the wall of the bushing to the outside. The bore is connectable to a pressure medium conduit and when the bore is filled with a pressure medium the tapering bolt is displaced from a clamped position, in which it expands the bushing, into a release position.

Suitably, for making the displacement of the tapering bolt easier, the conical inner face of the bushing is provided with ring grooves connected by bores arranged in the wall of the bushing, one of which bores extends to the outside and is connectable to a pressure medium conduit.

Advantageously, when the tapering bolt is in the clamped position it is secured against a displacement into the release position by a securing disc mounted on the shaft and contacting a taper or end of the tapering bolt.

Furthermore, it is suitable if the tapering bolt has an ascent that is smaller than the pertaining angle of friction, preferably an ascent of approximately 1 : 50.

According to a preferred embodiment, the bushing is closed with a lid at the end having the widest inner diameter. A guide pin arranged on the tapering bolt in the axial direction of the bushing extends through the lid to the outside. A bore running into the interior of the bushing in the region of the lid and connectable to a pressure medium conduit is provided, and when this bore is supplied with a medium under pressure, the tapering bolt is displaced from the release position into the clamped position. Thereby the assembly as well as the disassembly of the hub-shaft-connection can be carried out especially easily.

It is advantageous, if the outwardly projecting end of the guide pin lies in the plane of the lid surface when the tapering bolt is in the clamped position so as to indicate when the tapering bolt reaches the clamped position.

For securing the tapering bolt against a displacement into the release position, the securing disc contacts the end of the guide pin when the tapering bolt is in the clamped position.

In order to obtain a precise centrally aligned fit of the hub on the shaft, advantageously an even number of bores, preferably 6 or 8, is evenly distributed over the periphery of the shaft.

BRIEF DESCRIPTION OF THE DRAWINGS

The invention shall now be described in more detail by way of two embodiments and with reference to the accompanying drawings, wherein.

DESCRIPTION OF EXEMPLARY EMBODIMENTS

Figure 3:
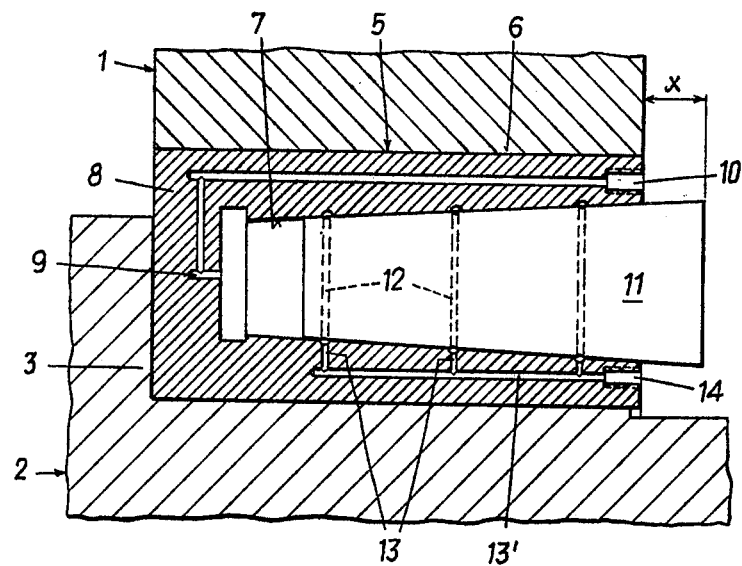

A hub 1 is e.g. of a toothed wheel, slipped onto a shaft 2, which hub is supported against a shaft shoulder 3. The fit present between hub and shaft is of no importance for transmitting the torque, and thus a fit with relatively wide tolerances can be provided. As a result the production of these parts is simple and inexpensive, as e.g. a sliding seat fit. The tolerances are to be selected depending on the required precision of the central alignment of the hub on the shaft. Six bores 4 evenly distributed around the periphery of the shaft, which bores have axes arranged to be parallel to the axis of the shaft 2 and are located at the periphery thereof, penetrate the hub 1 and the shaft 2 with one half of their periphery in each of these elements. The bores ae produced when the hub has been slipped onto the shaft. Into these bores 4, bushings 5 having a cylindrical outer face 6 and a tapering inner face 7 are inserted. The outer diameter of the bushings is so dimensioned that an easy mounting of the bushings is possible without a warming up or a supercooling at the site of assembly. That end of each bushing having the smallest diameter is closed by a bottom 8, in which bottom a bore 9 runs into the interior of the bushing 5. The bore 9 extends to the outside through the wall of the bushing and is connectable to a hydraulic conduit via a threaded connector 10. A tapering bolt 11 is inserted in the conical inner space of each bushing, the ascent (=taper ratio) is approximately 1 : 50. The tapering bolt 11 which according to FIG. 3 is inserted until it contacts the inner wall 7 of the bushing, protrudes from the bushing 5 by the extent $x$ (FIG. 3).

Figure 2:
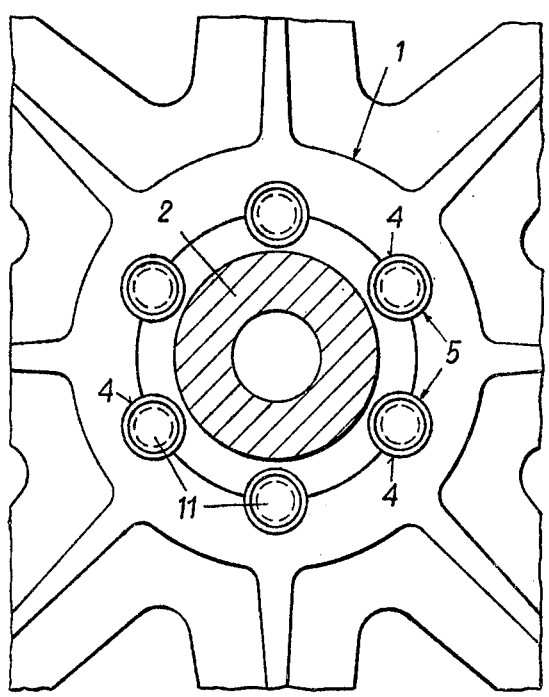
FIG. 2 shows a section along line II—II of FIG. 1, FIGS. 3 and 4 illustrate a detail of FIG. 1 on an enlarged scale.
Figure 1:
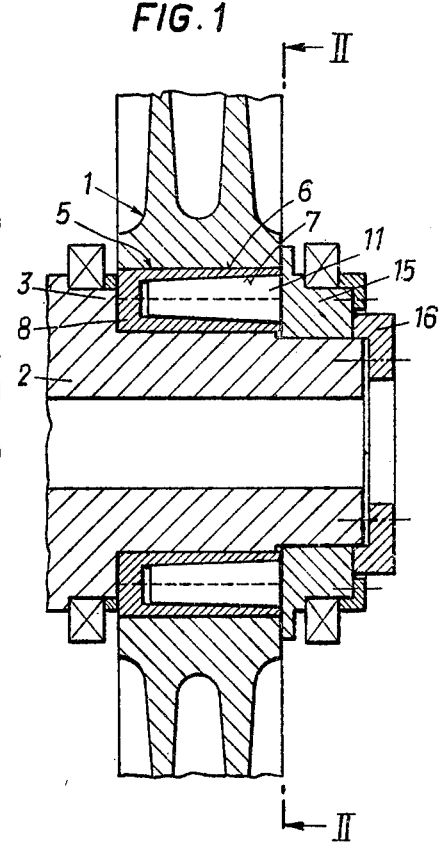
FIG. 1 shows a section through the axis of the shaft of the hub-shaft connection according to one embodiment.
Figure 4:
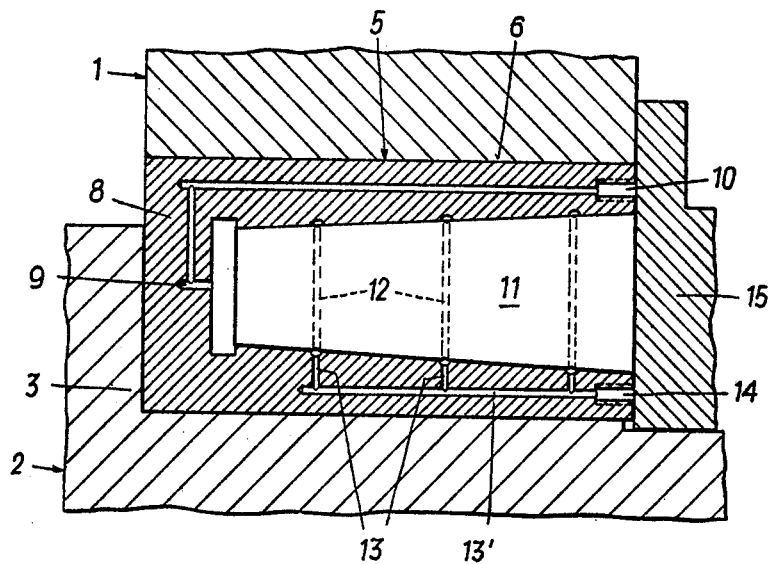

For mounting the hub 1 on the shaft 2, all the tapering bolts 11 are simultaneously pressed into the bushing, for instance by using a ring piston press. By displacing the tapering bolts 11 by the extent $x$, the bushings are expanded and press against the wall of the bores 4 penetrating the hub and the shaft. This clamped position is illustrated in FIGS. 1 and 4. The displacement path $x$ and the ascent of the tapering bolt 11 are adapted to each other in such a manner that a press fit is created between the bushing 5 and the bore 4 when the tapering bolt is in its clamped position.

The air present between the bottom 8 of the bushing and the taperng bolt 11 can escape through the bore 9. For facilitating the pressing in of the tapering bolts 11, the conical inner faces 7 of the bushings 5 are provided with ring grooves 12, which are in flow connection with the bores 13 and 13 ' arranged in the respective wall of the bushings. Each one of the bores 13' extends to the outside and can be attached to a hydraulic conduit via a threaded connector 14. By injecting hydraulic oil into the ring grooves 12 the bushing 5 is slightly expanded, whereby the tapering bolt 11 can be pressed more easily into the bushing 5.

A securing disc 15 and an end ring 16 press the hub 1 towards the shaft shoulder 3 and prevent a detachment of the tapering bolts 11, since one end of each bolt contacts the securing disc 15.

In releasing the connection, the securing disc 15 as well as the end ring 16 first have to be removed. Thereupon a hydraulic hand (pump not illustrated) is connected to the connector 10 of the bore 9 of each bushing 5. Upon actuation of the pump hydraulic oil flows into the free space between the tapering bolt 11 and the bottom 8 of the bushing 5 under a pressure of up to 1,500 atmospheres overpressure. This pressure presses the tapering bolt 11 into the release position, in which it again projects from the bushing by the extent $x$. By admitting a medium under pressure to the ring grooves 12, the release of the tapering bolt 11 can be facilitated. Then the bushings 5 can easily be pushed out of the bores 4. Thereupon the hub can be taken off the shaft again.

Figure 5:
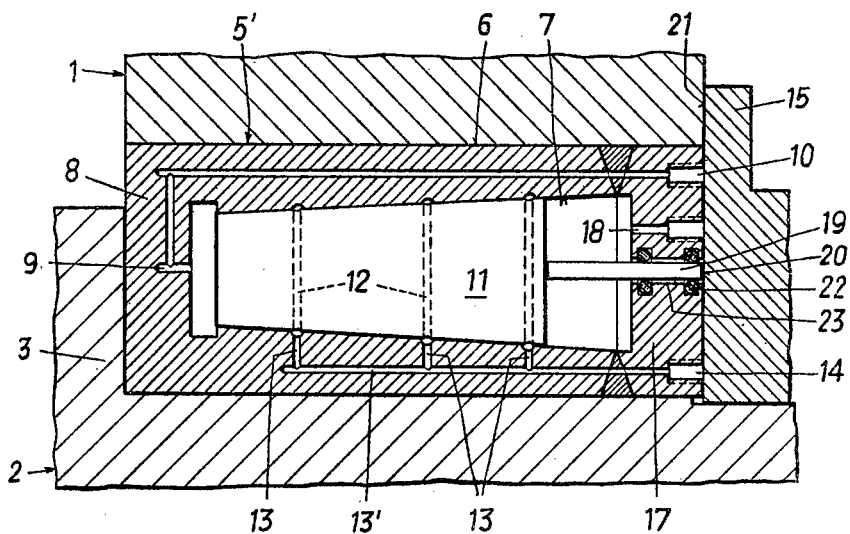
FIG. 5 shows another embodiment of the invention in an illustration analogous to that of FIG. 4.

FIG. 5 shows another embodiment of the invention, in which the bushing 5' is closed by a lid 17 welded to the bushing. The lid is provided with a bore 18 running into the interior of the bushing, which bore is also connectable to a hydraulic conduit. Thus it is possible to hydraulically press the tapering bolt 11, which is inserted in the bushing, into the clamped position, possibly by using a hand pump. The reaching of the clamped position is indicated by a guide pin 19 attached to the tapering bolt and penetrating the lid 17 of the bushing 5'. The length of the pin 19 is such that the end face 20 of the guide pin 19 lies in the plane of the lid surface in the clamped position. The securing disc 15 which is fixable on the shaft prevents an undesired displacement of the tapering bolt, whose guide pins 19 contact the side faces 21 of the securing disc facing the bushings. This clamped position is illustrated in FIG. 5. Seals 22 prevent an escape of the hydraulic oil at the lid bore 23 provided for the guide pin.

For disassembling the hub from the shaft, one has to proceed in the same manner as in the embodiments illustrated in FIGS. 1 to 4.

What we claim is:

1. In a releasable hub-shaft connection mechanism, in particular to be used in heavy machinery for transmitting strong torques, including: a shaft; a hub surrounding the shaft; at least one bore at the periphery of the shaft having an axis extending parallel to the axis of the shaft and penetrating the shaft and the hub to equal extents; a tubular bushing having a wall with a cylindrical outer face and a conical inner face, which bushing is to be accommodated in the at least one bore; and a tapering bolt axially displaceable in the bushing, the bushing being expandable by said tapering bolt, the improvement comprising:
   a closed bottom provided on the end of said bushing having the smallest inner diameter;
   a further bore extending through the bottom of the bushing to the outside; and
   a pressure medium means for supplying a medium to said further bore under a pressure sufficient to displace the tapering bolt from a clamped position, in which the tapering bolt expands the bushing, into a release position.

2. A releasable hub-shaft connection mechanism as set forth in claim 1, further comprising ring grooves provided in the conical inner face of the bushing and bushing wall bores provided to form a flow-connection between said ring grooves, one of said bushing wall bores extending to the outside and being connectable to a pressure medium means for supplying a medium to said ring grooves under a pressure sufficient to expand the bushing.

3. A releasable hub-shaft connection mechanism as set forth in claim 1, further comprising a securing disc mounted on the shaft and contacting an end of the tapering bolt so as to secure the tapering bolt in the clamped position against displacement into the release position.

4. A releasable hub-shaft connection mechanism as set forth in claim 1, wherein the tapering bolt has a taper ratio that is smaller than the pertaining angle of friction.

5. A releasable hub-shaft connection mechanism as set forth in claim 4, wherein said ascent amounts to approximately 1 : 50.

6. A releasable hub-shaft connection mechanism as set forth in claim 1, further comprising:
   a lid closing the bushing at the end of said bushing having the widest inner diameter;
   a guide pin attached to the tapering bolt and projecting in the axial direction of the bushing through a passage in said lid to the outside; and
   a lid bore provided through the lid to the inside of the bushing and being connectable to a pressure medium means for supplying a medium to said bore under sufficient pressure to displace the tapering bolt from the release position into the clamped position.

7. A releasable hub-shaft connection mechanism as set forth in claim 6, wherein the end of the guide pin projecting to the outside lies in the plane of the lid surface when the tapering bolt is in the clamped position.

8. A releasable hub-shaft connection mechanism as set forth in claim 6, further comprising a securing disc mounted on the shaft and contacting an end of the tapering bolt to secure the tapering bolt in the clamped position against displacement into the release position, the securing disc contacting the outwardly projecting end of the guide pin when the tapering bolt is in clamped position.

9. A releasable hub-shaft connection mechanism as set forth in claim 1, wherein an even number of bores, having axes extending parallel to the axis of the shaft and penetrating equally the shaft and the hub, is provided.

10. A releasable hub-shaft connection mechanism as set forth in claim 9, wherein six bores are provided.

11. A releasable hub-shaft connection mechanism as set forth in claim 9, wherein eight bores are provided.

* * * * *

UNITED STATES PATENT OFFICE
CERTIFICATE OF CORRECTION

Patent No. 4,105,343                                   Dated Aug. 8, 1978

Inventor(s) Riegler et al.

It is certified that error appears in the above-identified patent and that said Letters Patent are hereby corrected as shown below:

<u>First page</u>, <u>Item 30</u>, "Feb. 7, 1976" should read --Feb. 3, 1976--

<u>Col. 1</u>, <u>lines 6 and 7</u>, "hubshaft-connection" should read --hub-shaft connection--.

<u>Col. 2</u>, <u>line 28</u>, "a taper or" should read --an--;

<u>line 30</u>, "an" should read --a taper or--.

<u>Col. 3</u>, <u>line 4</u>, "A hub 1 is" should read --A hub 1,--;

<u>line 4</u>, "slipped" should read --is slipped--;

<u>line 17</u>, "ae" should read --are--;

<u>line 35</u>, "bushing" should read --bushings--;

<u>line 46</u>, "taperng" should read --tapering--; and

<u>line 63</u>, "hand (pump not illustrated)" should read --hand pump (not illustrated)--.

Signed and Sealed this

Twenty-seventh Day of February 1979

[SEAL]

Attest:

RUTH C. MASON
Attesting Officer

DONALD W. BANNER
Commissioner of Patents and Trademarks